United States Patent
Wu et al.

(10) Patent No.: US 11,870,831 B2
(45) Date of Patent: Jan. 9, 2024

(54) METHOD AND APPARATUS FOR PLAYING MULTIMEDIA STREAMING DATA

(71) Applicant: Samsung Electronics Co., Ltd., Suwon-si (KR)

(72) Inventors: Di Wu, Nanjing (CN); Ye Sun, Nanjing (CN); Siyuan Huang, Nanjing (CN); Chunbo Zhu, Nanjing (CN); Lie Zou, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 17/549,283

(22) Filed: Dec. 13, 2021

(65) Prior Publication Data

US 2022/0103609 A1    Mar. 31, 2022

Related U.S. Application Data (63) Continuation of application No. PCT/KR2020/008384, filed on Jun. 26, 2020.

(30) Foreign Application Priority Data

Jun. 26, 2019 (CN) .......................... 201910559977.X
Oct. 23, 2019 (CN) ........................... 201911011474.5

(51) Int. Cl.
*H04L 65/612* (2022.01)
*H04N 21/2187* (2011.01)
(Continued)

(52) U.S. Cl.
CPC ............ *H04L 65/612* (2022.05); *H04L 65/70* (2022.05); *H04L 65/765* (2022.05);
(Continued)

(58) Field of Classification Search
CPC ....... H04L 65/70; H04L 65/75; H04L 65/752; H04L 65/756; H04L 9/04; H04N 21/6587; H04N 21/26283; H04N 21/2187
See application file for complete search history.

(56) References Cited

U.S. PATENT DOCUMENTS

| | | |
|---|---|---|
| 6,445,738 B1 | 9/2002 | Zdepski et al. |
| 7,668,914 B2 | 2/2010 | Parker et al. |

(Continued)

FOREIGN PATENT DOCUMENTS

| | | |
|---|---|---|
| CN | 1893364 B | 3/2011 |
| CN | 102404650 A | 4/2012 |

(Continued)

OTHER PUBLICATIONS

Ozawa, Kazunori, et al., Dynamic Image Conversion Device, Dynamic Image Delivery System, Method for Converting Dynamic Image and Program, Oct. 10, 2009, WO 2009/122925 A1 (English Translation), pp. 1-45 (Year: 2009).*

(Continued)

*Primary Examiner* — Jonathan A Bui
(74) *Attorney, Agent, or Firm* — Jefferson IP Law, LLP (57) ABSTRACT

A transmission control method and an apparatus of multimedia streaming data are provided. The method includes, when an edge server is to transmit a data packet of a video requested by user equipment to the user equipment, and it is a first time that the edge server transmits the data packet according to the request, filtering, by the edge server, the data packet, and transmitting the filtered data packet to the user equipment, otherwise, directly transmitting the data packet to the user equipment, wherein the video includes an on-demand video and a real-time video, and playing, by the user equipment, the video directly according to the received data packet.

13 Claims, 5 Drawing Sheets

(51) Int. Cl.
  *H04N 21/231* (2011.01)
  *H04N 21/236* (2011.01)
  *H04N 21/239* (2011.01)
  *H04N 21/262* (2011.01)
  *H04N 21/6587* (2011.01)
  *H04L 65/70* (2022.01)
  *H04L 65/75* (2022.01)

(52) U.S. Cl.
  CPC ..... *H04N 21/2187* (2013.01); *H04N 21/2393* (2013.01); *H04N 21/23106* (2013.01); *H04N 21/23605* (2013.01); *H04N 21/26283* (2013.01); *H04N 21/6587* (2013.01)

(56) References Cited

U.S. PATENT DOCUMENTS

| | | | |
|---|---|---|---|
| 8,161,159 B1 | 4/2012 | Shetty et al. | |
| 8,407,747 B1* | 3/2013 | Inskip | H04N 21/2393 |
| | | | 725/90 |
| 10,284,615 B2 | 5/2019 | Gregotski | |
| 10,630,746 B1* | 4/2020 | Shen | H04L 65/70 |
| 2005/0002405 A1 | 1/2005 | Gao | |
| 2005/0081244 A1 | 4/2005 | Barrett et al. | |
| 2006/0242240 A1 | 10/2006 | Parker et al. | |
| 2010/0177754 A1* | 7/2010 | Emond | H04W 12/03 |
| | | | 370/338 |
| 2012/0210216 A1 | 8/2012 | Hurst | |
| 2014/0281035 A1* | 9/2014 | Harrison | H04N 19/115 |
| | | | 709/247 |
| 2014/0304603 A1* | 10/2014 | Forget | H04N 21/4331 |
| | | | 715/723 |
| 2016/0277737 A1 | 9/2016 | Muthu et al. | |
| 2018/0213261 A1 | 7/2018 | Konin et al. | |
| 2021/0099723 A1* | 4/2021 | De Praeter | H04N 21/236 |

FOREIGN PATENT DOCUMENTS

| | | | | |
|---|---|---|---|---|
| CN | 104284239 A | 1/2015 | | |
| CN | 105165015 A | 12/2015 | | |
| CN | 107801049 A | 3/2018 | | |
| EP | 1 523 190 A1 | 4/2005 | | |
| EP | 1523190 A1 * | 4/2005 | | H04L 12/185 |
| KR | 10-0859705 B1 | 9/2008 | | |
| KR | 10-2018-0056735 A | 5/2018 | | |
| WO | 97/40623 A1 | 10/1997 | | |
| WO | 2011/100727 A1 | 8/2011 | | |

OTHER PUBLICATIONS

International Search Report dated Sep. 25, 2020, issued in International Application No. PCT/KR2020/008384.
Chinese Office Action dated Aug. 12, 2021, issued in Chinese Application No. 201911011474.5.
European Search Report dated Sep. 12, 2022, issued in European Application No. 20830617.5.
European Search Report dated Nov. 10, 2022, issued in European Application No. 20830617.5.
Chinese Decision to Grant dated Jan. 11, 2022, issued in Chinese Application No. 201911011474.5.

* cited by examiner

METHOD AND APPARATUS FOR PLAYING MULTIMEDIA STREAMING DATA

CROSS-REFERENCE TO RELATED APPLICATION(S)

This application is a continuation application, claiming priority under § 365(c), of an International application No. PCT/KR2020/008384, filed on Jun. 26, 2020, which is based on and claims the benefit of a Chinese patent application number 201910559977.X, filed on Jun. 26, 2019, in the Chinese Intellectual Property Office, and of a Chinese patent application number 201911011474.5, filed on Oct. 23, 2019, in the Chinese Intellectual Property Office, the disclosure of each of which is incorporated by reference herein in its entirety.

BACKGROUND

1. Field

The disclosure relates to computer application technologies. More particularly, the disclosure relates to a method and an apparatus for playing multimedia streaming data.

2. Description of Related Art

In recent years, global Internet traffic has increased significantly. Video is a main contributor to the growth of global Internet traffic and will continue to dominate the global Internet traffic. This trend stems from the popularity of devices for accessing video contents, such as smart phones, tablet computers, gaming devices and smart televisions (TVs). According to the Cisco's forecast, future Internet traffic will increase exponentially. By 2021, the number of global Internet users will be up to 4.6 billion, the number of network access devices will be up to 27.1 billion, the proportion of video data access will increase from the current 73% to 82%, and the amount of data generated every month will exceed 190 EB (1 EB is equal to 230 GB). The huge amount of data will put huge pressure on communication networks and data transmission systems.

With the increase of mobile uplink and downlink bandwidth and the reduction of tariffs, live streaming videos have been endowed with more entertainment and social attributes. People enjoy live streaming anytime and anywhere. However, anchors are not satisfied with unidirectional live streaming, and audiences are more eager for interaction. Accordingly, the opening time and delay of live streaming have become important factors that affect the development of product functions.

The above information is presented as background information only to assist with an understanding of the disclosure. No determination has been made, and no assertion is made, as to whether any of the above might be applicable as prior art with regard to the disclosure.

SUMMARY

During the process of realizing the disclosure, inventors found that there is a large playing delay in video playing solutions of the related art. The main reasons are as follows.

Due to the limitation of video display, a picture must be played from a key frame, otherwise a blurred screen or a mosaic screen will be shown. To this end, a content server needs to construct the first data packet by using a key frame as a start frame. However, due to the limitation of network bandwidth, it is impossible that key frames are very dense in video data. In this way, a moment corresponding to the start frame of the first data packet may be significantly different from a moment that a user client requests for the video data. As a result, some of video data downloaded by the user client may be expired and needs to be discarded, or the played picture is inaccurate.

Aspects of the disclosure are to address at least the above-mentioned problems and/or disadvantages and to provide at least the advantages described below. Accordingly, an aspect of the disclosure is to provide a transmission control method and an apparatus of multimedia streaming data, which can effectively reduce a video playing delay.

Additional aspects will be set forth in part in the description which follows and, in part, will be apparent from the description, or may be learned by practice of the presented embodiments.

In order to achieve the above objective, the technical solutions of the disclosure are as follows.

In accordance with an aspect of the disclosure, a transmission control method of multimedia streaming data is provided. The transmission control method includes when an edge server is to transmit a data packet of a video requested by user equipment to the user equipment, and it is a first time that the edge server transmits the data packet according to the request, filtering, by the edge server, the data packet, and transmitting the filtered data packet to the user equipment, otherwise, directly transmitting the data packet to the user equipment, wherein the video includes an on-demand video and a real-time video, and playing, by the user equipment, the video directly according to the received data packet.

In an implementation, when the video is the real-time video, the filtering includes detecting, by the edge server, whether the data packet contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, otherwise, discarding the data packet received currently, and repeating this step when receiving a next data packet of the real-time video, wherein the first moment is a moment that the edge server receives the first data packet of the video from a content server.

In an implementation, when the video is the real-time video, the filtering includes detecting, by the edge server, whether the data packet contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, wherein the first moment is a moment that the user equipment requests the video from a content server.

In an implementation, when the video is the on-demand video, the filtering includes using a data frame corresponding to a second moment in the data packet as a start frame, performing encoding and multiplexing operations on the start frame and all data frames following the start frame in the data packet according to a preset data packet generation method, and transmitting a generated data packet to the user equipment, wherein the second moment is a start playing moment specified in the request transmitted by the user equipment.

In an implementation, the data packet generation method includes if a data frame sequence contains key frames, and the start frame is not a key frame, recoding all data frames prior to the first key frame in the data frame sequence, multiplexing and packaging the recoded data frames and unrecoded data frames in the data frame sequence together to generate a corresponding data packet, wherein the data frame sequence includes all data frames used to generate the data packet, if the start frame of the data frame sequence is a key frame, multiplexing and packaging all data frames in the data frame sequence together to generate a corresponding data packet, and if the data frame sequence does not contain a key frame, recoding all the data frames in the data frame sequence, and multiplexing and packaging the recoded data frames together to generate a corresponding data packet.

In an implementation, the method further includes when receiving an on-demand request from the user equipment, determining, by the edge server, whether a data packet corresponding to a start playing moment specified in the on-demand request is currently stored in a cache, if the data packet corresponding to the start playing moment is currently stored in the cache, obtaining the data packet corresponding to the on-demand request from the cache, otherwise, obtaining the data packet corresponding to the on-demand request from a content server.

In an implementation, the method further includes determining, by the edge server, a weight of each data frame of the on-demand video in the entire video in advance according to a principle that the more important the data frame is, the greater the weight is, by using a machine learning method, and after receiving a stunt playing on-demand request for the on-demand video from the user equipment, determining, by the edge server, a weight threshold corresponding to a compression strength specified in the stunt playing on-demand request according to a preset mapping relationship between compression strengths and weight thresholds, for a data packet to be transmitted to the user equipment, which is currently stored in a cache, discarding, by the edge server, a data frame contained in the data packet, whose weight is less than the determined weight threshold, performing encoding and multiplexing operations on a data frame contained in the data packet, whose weight is greater than or equal to the determined weight threshold, and transmitting a generated data packet to the user equipment.

In an implementation, the method further includes after receiving a specified multiple speed playing request from the user equipment, for a data packet to be transmitted to the user equipment, which is currently stored in a cache, clipping, by the edge server, data frames contained in the data packet according to a manner of reserving one data frame every N data frames, performing encoding and multiplexing operations on the data frames reserved after the clipping, and transmitting a generated data packet to the user equipment, wherein N is a playing multiple specified in the specified multiple speed playing request.

In accordance with another aspect of the disclosure, a transmission control apparatus of multimedia streaming data, configured in an edge server, is provided. The transmission control apparatus includes a processor, configured to when an edge server is to transmit a data packet of a video requested by user equipment to the user equipment, and it is a first time that the edge server transmits the data packet according to the request, filter the data packet, and transmit the filtered data packet to the user equipment, otherwise, directly transmit the data packet to the user equipment, wherein the video includes an on-demand video and a real-time video.

In an implementation, when the video is the real-time video, the processor performing the filtering includes detecting whether the data packet contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, otherwise, discarding the data packet received currently, and repeating this step when receiving a next data packet of the real-time video, wherein the first moment is a moment that the edge server receives the first data packet of the video from a content server.

In an implementation, when the video is the real-time video, the processor performing the filtering includes detecting whether the data packet of the real-time video currently received by the edge server contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, wherein the first moment is a moment that the user equipment requests the video from a content server.

In an implementation, when the video is the on-demand video, the processor performing the filtering includes using a data frame corresponding to a second moment in the data packet as a start frame, performing encoding and multiplexing operations on the start frame and all data frames following the start frame in the data packet according to a preset data packet generation method, and transmitting a generated data packet to the user equipment, wherein the second moment is a start playing moment specified in the request transmitted by the user equipment.

In an implementation, the data packet generation method includes if a data frame sequence contains key frames, and the start frame is not a key frame, recoding all data frames prior to the first key frame in the data frame sequence, multiplexing and packaging the recoded data frames and unrecoded data frames in the data frame sequence together to generate a corresponding data packet, wherein the data frame sequence includes all data frames used to generate the data packet, if the start frame of the data frame sequence is a key frame, multiplexing and packaging all data frames in the data frame sequence together to generate a corresponding data packet, and if the data frame sequence does not contain a key frame, recoding all the data frames in the data frame sequence, and multiplexing and packaging the recoded data frames together to generate a corresponding data packet.

In an implementation, the processor is further configured to when the edge server receives an on-demand request from the user equipment, determine whether a data packet corresponding to a start playing moment specified in the on-demand request is currently stored in a cache, if the data packet corresponding to the start playing moment is currently stored in the cache, obtain the data packet corresponding to the on-demand request from the cache, otherwise, obtain the data packet corresponding to the on-demand request from a content server.

In an implementation, the processor is further configured to determine a weight of each data frame of the on-demand video in the entire video in advance according to a principle that the more important the data frame is, the greater the weight is, by using a machine learning method, and after receiving a stunt playing on-demand request for the on-demand video from the user equipment, determine a weight threshold corresponding to a compression strength specified in the stunt playing on-demand request according to a preset mapping relationship between compression strengths and weight thresholds, for a data packet to be transmitted to the user equipment, which is currently stored in a cache, discard a data frame contained in the data packet, whose weight is less than the determined weight threshold, perform encoding and multiplexing operations on a data frame contained in the data packet, whose weight is greater than or equal to the determined weight threshold, and transmit a generated data packet to the user equipment.

In an implementation, the processor is further configured to after receiving a specified multiple speed playing request from the user equipment, for a data packet to be transmitted to the user equipment, which is currently stored in a cache, clip data frames contained in the data packet according to a manner of reserving one data frame every N data frames, perform encoding and multiplexing operations on the data frames reserved after the clipping, and transmit a generated data packet to the user equipment, wherein N is a playing multiple specified in the specified multiple speed playing request.

Embodiments of the application also provide a non-transitory computer-readable medium for storing instructions that, when executed, cause a processor to perform the transmission control method of multimedia streaming data described above.

Embodiments of the application also provide an electronic device, including the non-transitory computer-readable medium described above, and the processor accessing the non-transitory computer-readable medium.

In summary, in the transmission control method and an apparatus of multimedia streaming data proposed by the disclosure, when transmitting the data packet to the user equipment for the first time according to the video request of the user equipment, the edge server filters the data packet firstly, and then transmits the filtered data packet to the user equipment. In this way, by filtering the first data packet transmitted to the user equipment by the edge server in advance, on the one hand, the number of expired data frames contained in the first data packet that is downloaded by the user equipment can be reduced significantly, on the other hand, the user equipment does not need to process data frames contained in the first data packet, and may directly play the corresponding video, thereby reducing the processing overhead of the user equipment during the playing process of the video. Therefore, the disclosure not only can effectively increase the startup speed of the user equipment playing the video and reduce the video playing delay, but also can reduce the processing overhead of the user equipment during the playing process of the video.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
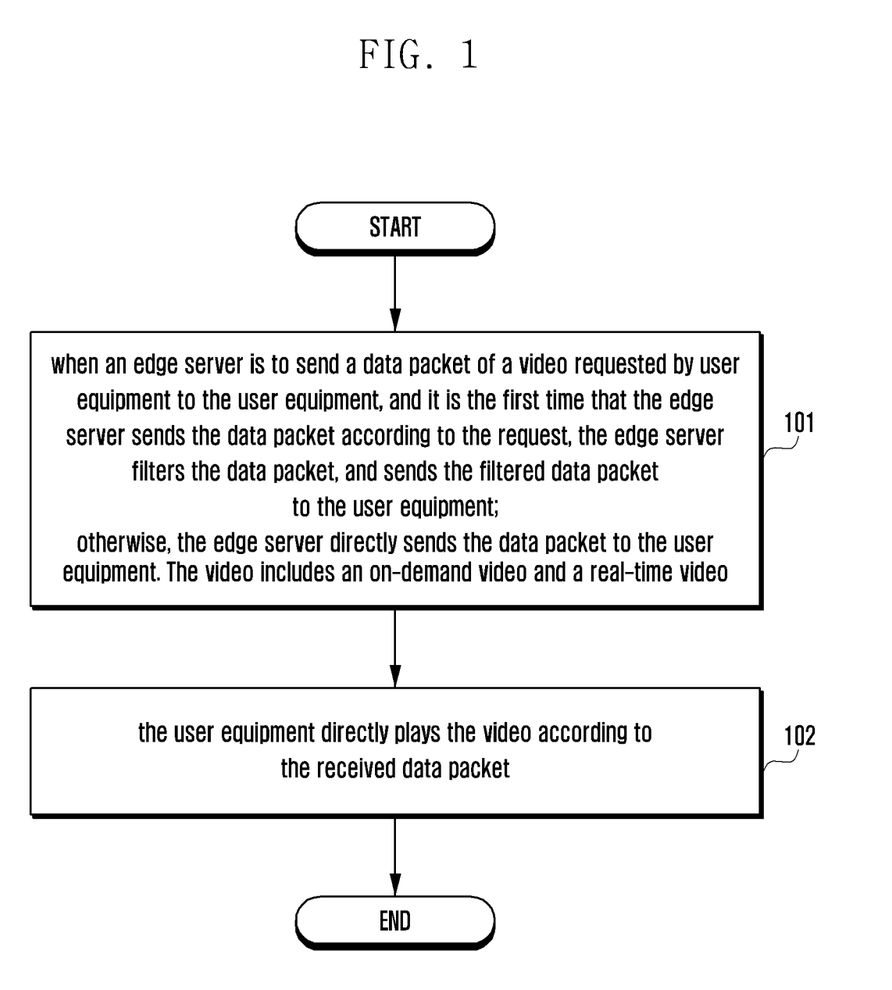
FIG. 1 is a schematic flowchart of a method according to an embodiment of the disclosure.

FIG. 1 is a schematic flowchart of a method according to an embodiment of the disclosure.

Referring to FIG. 1, the transmission control method of multimedia streaming data provided by the embodiments may include the following operations.

At operation 101, when an edge server is to transmit a data packet of a video requested by user equipment to the user equipment, and it is the first time that the edge server transmits the data packet according to the request, the edge server filters the data packet, and transmits the filtered data packet to the user equipment. Otherwise, the edge server directly transmits the data packet to the user equipment. The video includes an on-demand video and a real-time video.

In this operation, when the edge server between a player device of the user (such as a TV set-top box, a personal computer, a tablet computer, a mobile phone, or other terminal devices) and a content server is to transmit the data packet of the video requested by the user equipment to the user equipment, and it is the first time that the edge server transmits the data packet according to the request, the edge server filters the data packet, and transmits the filtered data packet to the user equipment. Otherwise, the edge server transparently transmits the data packet to the user equipment. In this way, by filtering the first data packet transmitted to the user equipment by the edge server in advance, on the one hand, the number of expired data frames contained in the first data packet that is downloaded by the user equipment can be reduced significantly, thereby reducing the video playing delay and increasing the startup speed of the video playing, on the other hand, the user equipment does not need to process data frames contained in the first data packet, and may directly play the corresponding video, thereby reducing the processing overhead of the user equipment during the playing process of the video.

In practical applications, the video may be an on-demand video or a real-time video. Specifically, the real-time video may be a live broadcast video or a live streaming video.

In an implementation, when the video is a real-time video, at operation 101, the filtering process may be performed by using the following two methods.

In a first method, the edge server detects whether the data packet contains a data frame corresponding to a first moment. If the data packet contains the data frame corresponding to the first moment, the edge server uses the data frame corresponding to the first moment as a start frame, and performs an encoding and multiplexing operation on the start frame and all data packets following the start frame in a data frame sequence contained in the data packet according to a preset data packet generation method, and transmits a generated data packet to the user equipment. Otherwise, the edge server discards the data packet received currently, and repeats this operation when receiving a next data packet of the real-time video.

In an implementation, in order to maximize the quick startup of the video by the user equipment, the first moment may be a moment that the user equipment requests the video from the content server.

Further, the first moment may also be a moment that the edge server receives the first data packet of the video delivered by the content server. In this way, the real-time video can be played synchronously to a maximum extent while it is started quickly.

In an implementation, the data frames within a minimum range may be recoded to reduce the amount of recoded data, thereby reducing the processing overhead of the user equipment. Specifically, a following data packet generation method may be used to achieve this purpose.

If the data frame sequence contains key frames and the start frame is not a key frame, all data frames prior to the first key frame in the data frame sequence are recoded, the recoded data frames and unrecoded data frames (i.e., data frames that are not recoded) in the data frame sequence are multiplexed and packaged together to generate a corresponding data packet. Herein, the data frame sequence includes all data frames used to generate the data packet.

If the start frame of the data frame sequence is a key frame, all data frames in the data frame sequence are multiplexed and packaged together to generate a corresponding data packet.

If the data frame sequence does not contain a key frame, all the data frames in the data frame sequence are recoded, and the recoded data frames are multiplexed and packaged together to generate a corresponding data packet.

It should be noted that, in the above data packet generation method, if the start frame is not a key frame, the recoding operation needs to be performed to ensure that the start frame is a key frame, so as to avoid a blurred screen or a mosaic screen during the playing process of the video.

Figure 3:
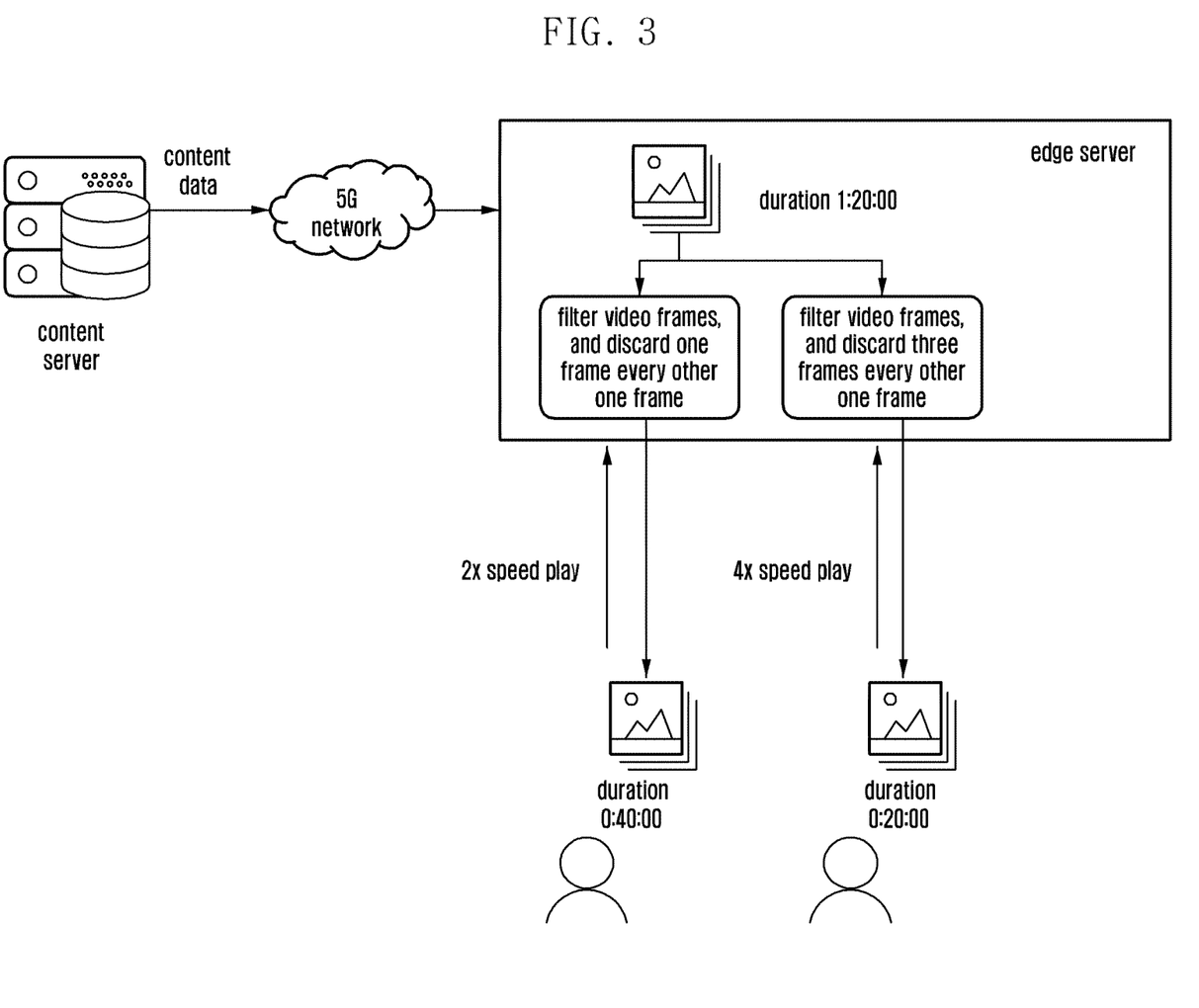
FIG. 3 is a schematic diagram of an accurate multiple speed playing scenario according to an embodiment of the disclosure.

In the above first method, referring to FIG. 3, the edge server needs to process the data packet containing the data frame corresponding to the first moment, use the data frame corresponding to the first moment as the start frame, repackage the start frame and the data frames following the start frame in the data packet, and transmit the regenerated data packet to the user equipment. In this way, by processing the data packet in advance by the edge server, the first data frame in the data packet may correspond to the first moment. On the one hand, the user equipment can directly play the video from the first data frame, which effectively shortens the startup time of the video. On the other hand, the number of expired data frames contained in the first data packet that is transmitted to the user equipment can be reduced effectively, so that the video playing progress of the player device is much closer to the recording progress of the real-time video, which effectively reduces the video playing delay, and further meets the user's synchronization playing requirements on the real-time video.

In practical applications, after receiving the data packet, the edge server needs to de-multiplex and decode the data packet to obtain the data frame sequence contained in the data packet. The specific method is well known for those skilled in the art and will not be described herein.

In a second method, the edge server detects whether the data packet contains a data frame corresponding to a first moment. If the data packet contains the data frame corresponding to the first moment, the edge server uses the data frame corresponding to the first moment as a start frame, performs encoding and multiplexing operations on the start frame and all data packets following the start frame in a data frame sequence contained in the data packet according to a preset data packet generation method, and transmits a generated data packet to the user equipment. The first moment is a moment that the user equipment requests the video from the content server.

In an implementation, the above second method may use the same data packet generation method as that used in the first method.

In an implementation, when the video is an on-demand video, at operation 101, the filtering process may be performed by using the following method.

The edge server uses a data frame corresponding to a second moment in the data packet as the start frame, and performs encoding and multiplexing operations on the start frame and all data frames following the start frame in the data packet according to a preset data packet generation method, and transmits a generated data packet to the user equipment. The second moment is a start playing moment specified in the request transmitted by the user equipment.

In an implementation, the above method may use the same data packet generation method as that used in the first method.

In a second method, the data frame corresponding to the second moment may be p-frame. P-frame may be a frame that can be decoded by referring to an adjacent frame. The adjacent frame may be next frame of the data frame corresponding to the second moment. The encoding and multiplexing operation may operate on the data frame corresponding to the second moment and subsequent frames of the data frame. The encoding and multiplexing operation may not operate on frames before the data frame corresponding to the second moment. This operation means that the start frame generated by encoding the data frame may be i-frame. I-frame may be a frame that can be decoded by referring to the i-frame only, without referring to an adjacent frame.

In a first method, the edge server may receive a user request from the user equipment. The user request includes a start time point of at least part of the video. The start time point corresponds to the second moment. The edge server may identify whether the data frame corresponding to the second moment is the i-frame or the p-frame. The edge server may perform encoding and multiplexing operation by transforming the data frame from the p-frame to the i-frame based on identification that the data frame corresponding to the second moment is the p-frame.

In the above method, by using the data frame corresponding to the start playing moment specified in the user's on-demand request as the start frame, and performing encoding and multiplexing operations, the start frame can be a key frame and the moment corresponding to the start frame is the start playing moment specified in the on-demand request. In this way, the user equipment can play the video from the data frame corresponding to the start playing moment, rather than play the video from the key frame closest to a start playing position, thereby improving the accuracy of video on demand and effectively shortening the response time of video on demand.

It can be seen from the above filtering process that, on the one hand, the number of expired data frames can be reduced through the filtering process, and on the other hand, it can be ensured that the first data frame in the data packet is a key frame. In this way, the user equipment may directly play the video after receiving the data packet.

At operation 102, the user equipment directly plays the video according to the received data packet.

In this operation, since the first data packet received by the user equipment have been processed by the edge server, the first data frame in the data packet will be a key frame. Accordingly, the user equipment may directly play the video according to the received data packet without needing to process the data packet, thereby increasing the startup speed of video playing.

Figure 2:
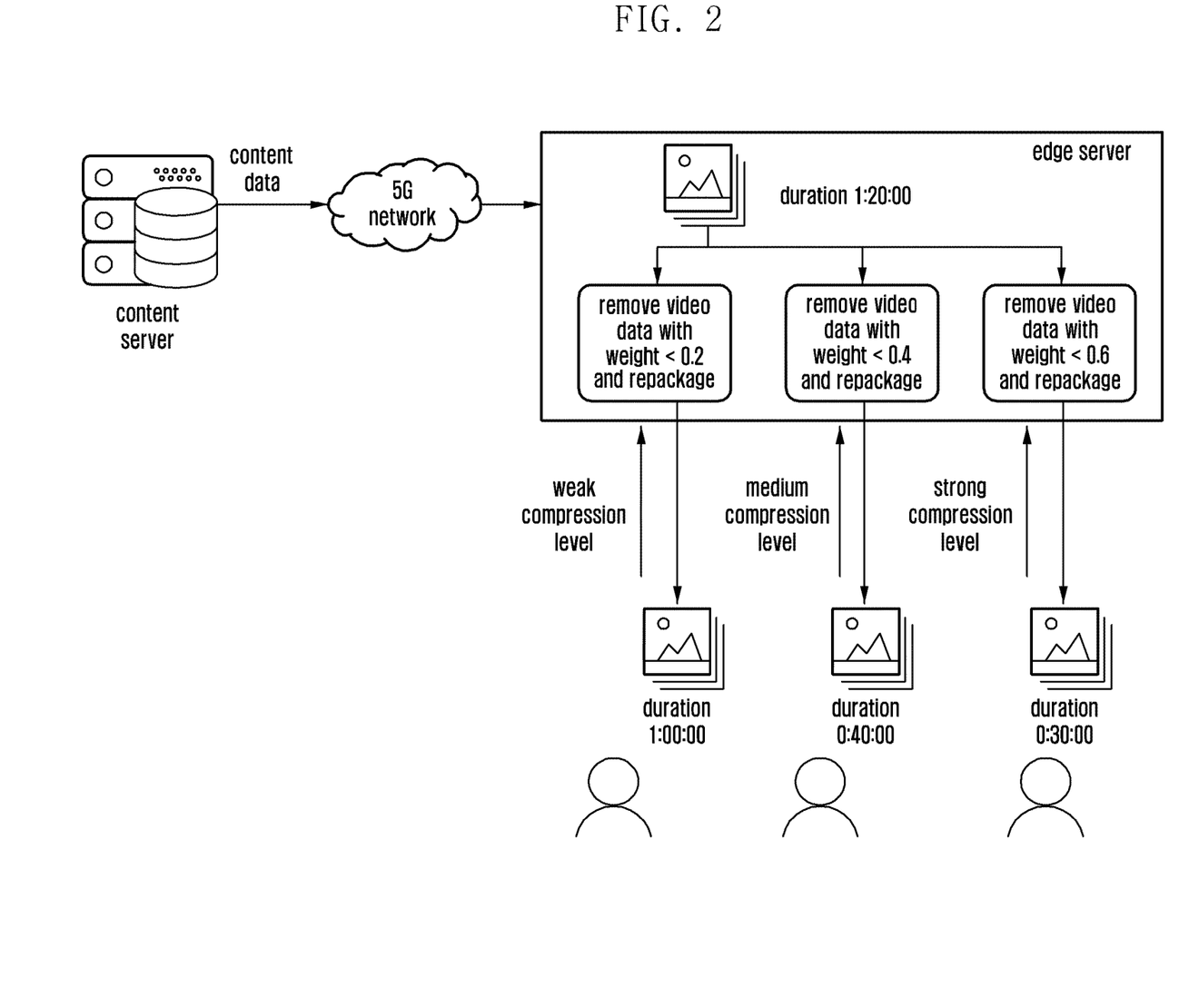
FIG. 2 is a schematic diagram of a stunt playing scenario according to an embodiment of the disclosure.

FIG. 2 is a schematic diagram of a stunt playing scenario according to an embodiment of the disclosure.

Referring to FIG. 2, in practical applications, in an on-demand scenario, the user equipment may submit a stunt playing request to achieve the fast playing of the video. For the request of the user equipment, in an implementation, the edge server shown in FIG. 2 may use a following processing method to obtain a stunt effect that non-key scenarios are fast forwarded flexibly and key scenarios are played normally.

The edge server determines a weight of each data frame of the on-demand video in the entire video in advance according to a principle that the more important the data frame is, the greater the weight is, by using a machine learning method.

After receiving a stunt playing on-demand request for the on-demand video from the user equipment, the edge server determines a weight threshold corresponding to a compression strength specified in the stunt playing on-demand request according to a preset mapping relationship between compression strengths and weight thresholds. For a data packet to be transmitted to the user equipment, which is currently stored in a cache, the edge server discards a data frame contained in the data packet, whose weight is less than the determined weight threshold, and performs encoding and multiplexing operations on a data frame contained in the data packet, whose weight is greater than or equal to the determined weight threshold, and transmits a generated data packet to the user equipment.

In the above method, the edge server needs to determine the weight of each data frame in advance according to the principle that the more important the data frame is, the greater the weight is, by using the machine learning method. In this way, the greater the weight of the data frame is, the higher the importance of the data frame in the entire video is, and the more critical the data frame is.

In practical applications, each data frame of the video may be analyzed by using the machine learning method. The importance of the current video segment may be determined by using the following judgment bases: whether the switching frequency of the current program segment scenario is high, whether the dynamic change of picture is frequent, whether the amount of information of audio data is dense, and the behaviors of online users viewing the picture (such as whether to fast forward the picture continuously or whether to perform a skip playing operation). Based on this, the weight of each data frame may be set. The method for determining the above-mentioned weight by using the machine learning method is well known for those skilled in the art, and will not be described herein.

In the above method, according to the compression strength requested by the user equipment, the data frame whose weight is less than the weight threshold corresponding to the compression strength is removed, and only the data frame whose weight is greater than the weight threshold is transmitted to the user equipment, so that a selected part of the video can be fast played. In this way, the user can fast forward non-key scenarios flexibly, and play key scenarios normally. Accordingly, the viewing time of the user can be reduced while ensuring that the user sees all important information of the program.

FIG. 3 is a schematic diagram of an accurate multiple speed playing scenario according to an embodiment of the disclosure.

Referring to FIG. 3, in practical applications, in the on-demand scenario, the user equipment may submit a specified multiple speed playing request to achieve the fast-forward playing of the video. For the request of the user equipment, in an implementation, the edge server shown in FIG. 3 may use a following processing method.

After receiving a specified multiple speed playing request from the user equipment, for a data packet to be transmitted to the user equipment, which is currently stored in a cache, the edge server clips data frames contained in the data packet according to a manner of reserving one data frame every N frames, performs encoding and multiplexing operations on the data frames reserved after the clipping, and transmits a generated data packet to the user equipment. Herein, N is a playing multiple specified in the specified multiple speed playing request.

It should be noted that, in the above method, the encoding and multiplexing operations are performed on all the data frames reserved after the clipping. In this way, according to the data packet generation method of the related art, it can be ensured that the start frame in the generated data packet is a key frame, so that there is no need to identify the key frame.

In the above method, the data frames contained in the data packet needs to be clipped according to the manner of reserving one data frame every N data frames. For example, for a 2× speed playing request, one data frame is reserved every two data frames, and for a 4× speed playing request, one data frame is reserved every four data frames. In this way, the fast-forward playing requirements of the user can be achieved.

In practical applications, those skilled in the art may select one to-be-reserved data frame every N data frames according to actual demands, for example, select the first data frame every N data frames, or the last data frame every N data frames, or an intermediate data frame every N data frames, which is not limited herein.

The following describes the specific implementation of the above method embodiments through implementation examples in three specific scenarios.

Figure 4:
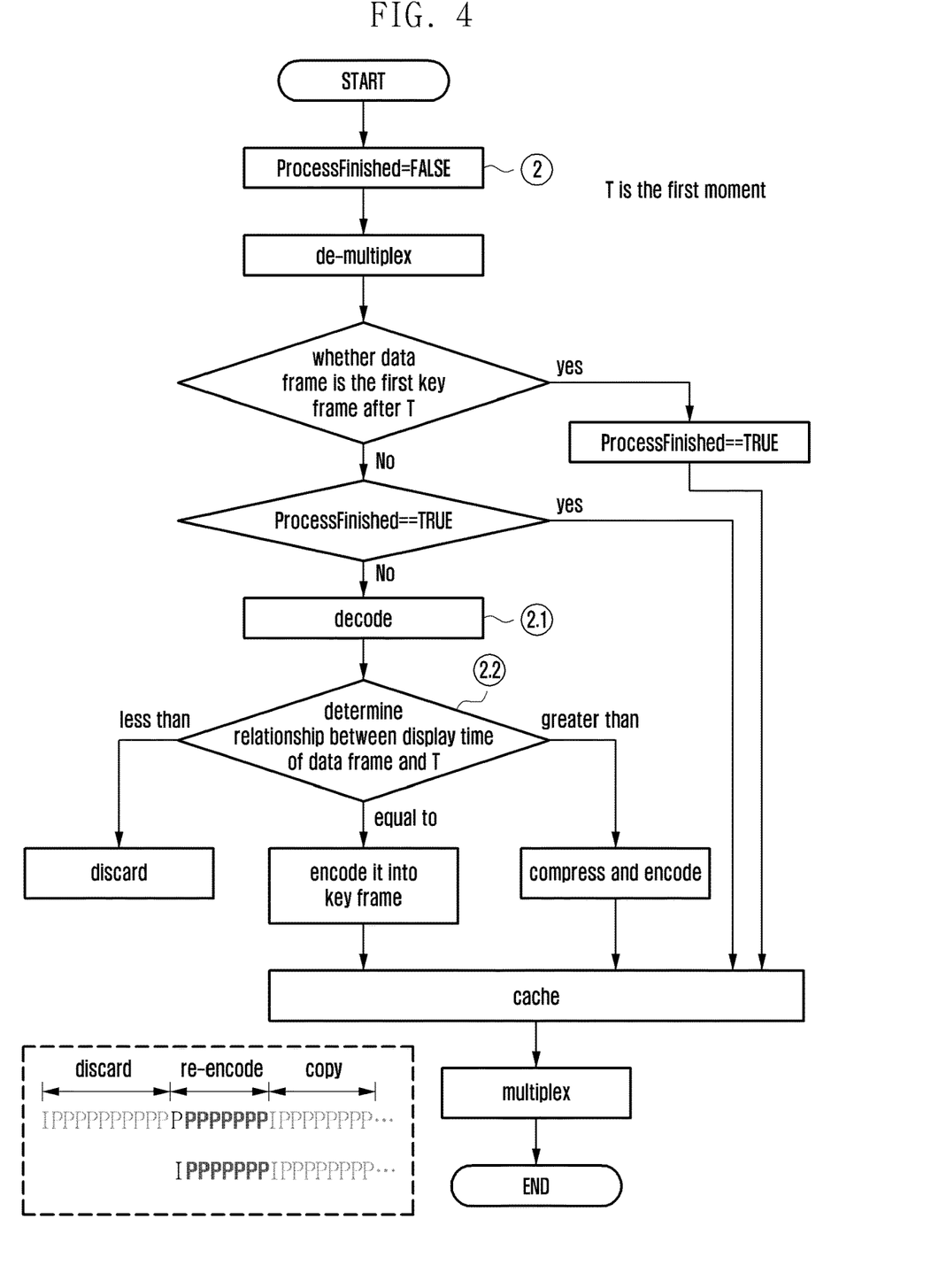
FIG. 4 is a schematic flowchart of a process of preprocessing a data packet when a live streaming scenario or an on-demand scenario is quickly started according to an embodiment of the disclosure.

FIG. 4 is a schematic flowchart of a process of preprocessing a data packet when a live streaming scenario or an on-demand scenario is quickly started according to an embodiment of the disclosure.

Referring to FIG. 4, in a first embodiment of the disclosure, a user watches a live stream.

The user starts to watch the live stream.

The edge server detects whether the data packet is a start packet. If the data packet is the start packet, the edge server performs the following operations. Otherwise, the edge server directly transmits the data packet to the user equipment without any processing.

At operation 2, as shown in FIG. 4, the edge server de-multiplexes the start packet and performs the processing of operations 2.1 and 2.2 on data frames obtained by de-multiplexing the start packet.

At operation 2.1, the edge server decodes a data frame and determines a relationship between the display time of the data frame and the first moment. If it is determined at operation 2.1 that the display time is less than the first moment, the edge server discards the data frame. If it is determined at operation 2.1 that the display time is equal to the first moment, the edge server encodes the data frame into a key frame. If it is determined at operation 2.1 that the display time is greater than the first moment, the edge server encodes the data frame into a non-key frame.

Herein, the first moment is a moment that the user equipment requests the video from the content server.

At operation 2.2, the edge server repeats operation 2.1 until a key frame whose display time is greater than the first moment occurs or the start packet is finished.

The edge server re-multiplexes the data frame, packages it into a new data packet and transmits the new data packet to the user equipment.

The user equipment de-multiplexes and decodes the new data packet after receiving the new data packet, and displays the obtained data directly without discarding the expired data frame, thereby achieving the low delay of the live stream.

In a second embodiment of the disclosure, the user performs an operation of specifying a playing position when watching an on-demand stream.

The user performs an operation of specifying a playing position when watching an on-demand stream, requests data from the content server, and transmits the information of the specified playing position to the edge server.

The edge server detects whether a data packet contains the information of the specified playing position. If the data packet contains the information of the specified playing position, the edge server performs operations 3 and 4. Otherwise, the edge server directly transmits the data packet to the user equipment without any processing.

At operation 2, as shown in FIG. 4, the edge server de-multiplexes the data packet, and performs the processing of operations 2.1 and 2.2 on data frames obtained by de-multiplexing the data packet.

At operation 2.1, the edge server decodes the data frame and determines a relationship between the display time of the data frame and the specified playing time. If the display time is less than the specified playing time, the edge server discards the data frame. If the display time is equal to the specified playing time, the edge server encodes the data frame into a key frame. If the display time is greater than the specified playing time, the edge server encodes the data frame into a non-key frame.

At operation 2.2, the edge server repeats operation 2.1 until a key frame whose display time is greater than the specified playing time occurs or the data packet is finished.

The edge server re-multiplexes the data frame, packages it into a new data packet and transmits the new data packet to the user equipment.

The user equipment may directly process and display the new data packet after receiving the new data packet, thereby achieving a fast display effect and an accurate Seek effect on the user equipment.

In a third embodiment of the disclosure, the user requests the fast playing of an on-demand stream when watching the on-demand stream.

Figure 5:
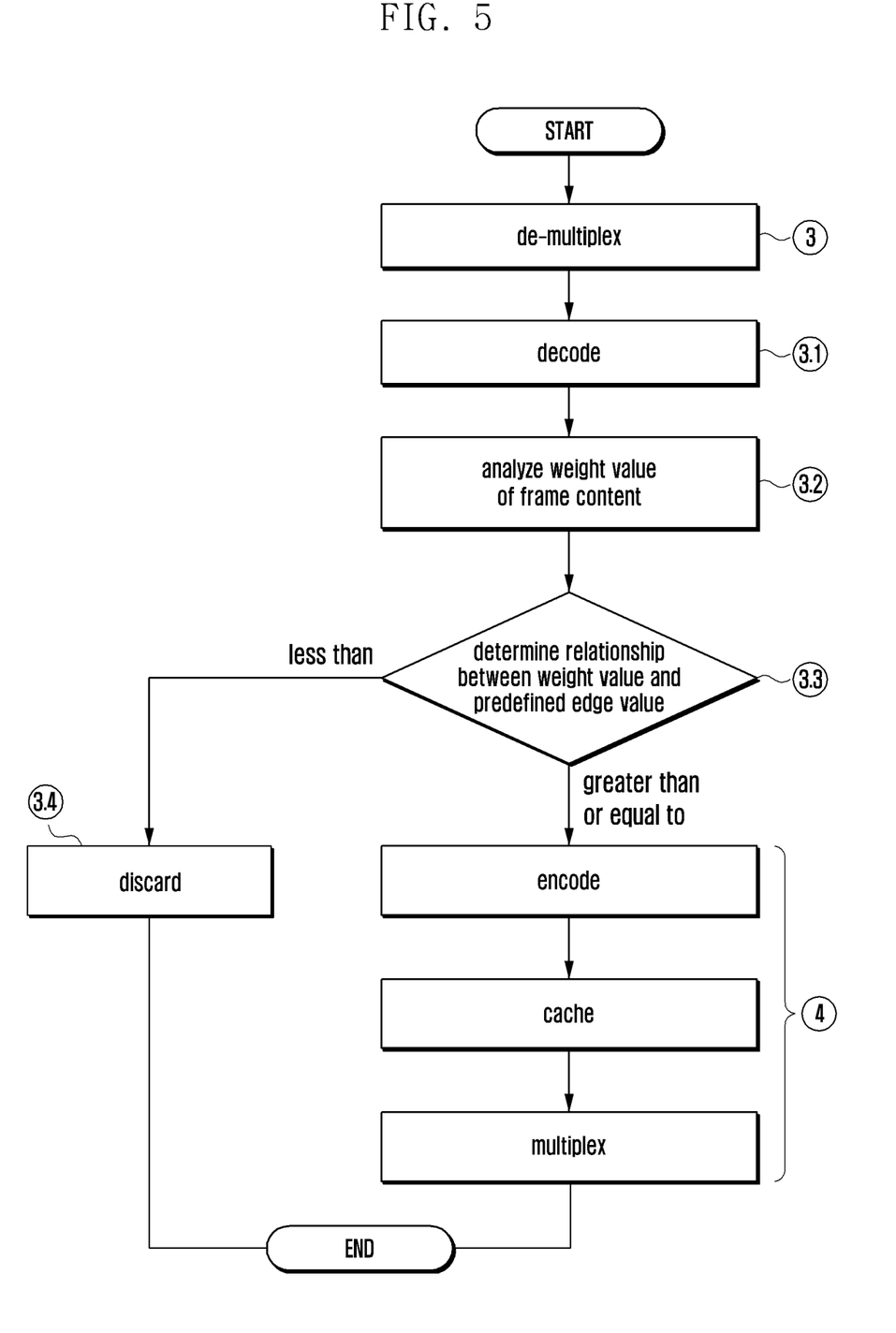
FIG. 5 is a schematic flowchart of a process of preprocessing a data packet when performing stunt playing in an on-demand scenario according to an embodiment of the disclosure.

FIG. 5 is a schematic flowchart of a process of preprocessing a data packet when performing stunt playing in an on-demand scenario according to an embodiment of the disclosure.

Referring to FIG. 5, the user equipment transmits a fast playing request to the edge server.

After receiving a fast playing request, the edge server obtains a multimedia data compression boundary value according to the specific request, and performs the processing of operation 3 on each data packet until a fast playing cancellation request is received.

At operation 3, as shown in FIG. 5, the edge server de-multiplexes the data packet, and performs the processing of operation 3.1 on each data frame obtained by de-multiplexing the data packet.

At operation 3.1, the edge server decodes the data frame and at operation 3.2, analyzes the decoded data frame to obtain a weight indicating the importance of the current data frame. At operation 3.3, the edge server determines the relationship between the weight value and predefined edge value.

If is determined at operation 3.3 that the weight is greater than the compression boundary value obtained, the edge server compresses the current data frame. Otherwise, the edge server discards it at operation 3.4.

At operation 4, the edge server encodes, caches, and multiplexes the data frame, packages it into a new data packet and transmits the new data packet to the user equipment.

After receiving the new data packet, the user equipment may directly process and play the new data packet without any processing, thereby achieving a fast playing effect.

Embodiments of the disclosure also provide a transmission control apparatus of multimedia streaming data corresponding to the above method embodiments of the disclosure, which is configured in an edge server and includes a processor. The processor is configured to:

when an edge server is to transmit a data packet of a video requested by user equipment to the user equipment, and it is the first time that the edge server transmits the data packet according to the request, filter the data packet, and transmit the filtered data packet to the user equipment. Otherwise, directly transmit the data packet to the user equipment, wherein the video includes an on-demand video and a real-time video.

In an implementation, when the video is the real-time video, the processor performing the filtering includes:

detecting whether the data packet contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, otherwise, discarding the data packet received currently, and repeating this operation when receiving a next data packet of the real-time video, wherein the first moment is a moment that the edge server receives the first data packet of the video from a content server.

In an implementation, when the video is the real-time video, the processor performing the filtering includes:

detecting whether the data packet of the real-time video currently received by the edge server contains a data frame corresponding to a first moment, if the data packet contains the data frame corresponding to the first moment, using the data frame corresponding to the first moment as a start frame, performing encoding and multiplexing operations on the start frame and all data frames following the start frame in the data packet according to a preset data packet generation method, and transmitting a generated data packet to the user equipment, wherein the first moment is a moment that the user equipment requests the video from a content server.

In an implementation, when the video is the on-demand video, the processor performing the filtering includes:

using a data frame corresponding to a second moment in the data packet as a start frame, performing encoding and multiplexing operations on the start frame and all data frames following the start frame in the data packet according to a preset data packet generation method, and transmitting a generated data packet to the user equipment, wherein the second moment is a start playing moment specified in the request transmitted by the user equipment.

In an implementation, the data packet generation method includes:

if a data frame sequence contains key frames, and the start frame is not a key frame, recoding all data frames prior to the first key frame in the data frame sequence, multiplexing and packaging the recoded data frames and unrecoded data frames in the data frame sequence together to generate a corresponding data packet; wherein the data frame sequence includes all data frames used to generate the data packet, if the start frame of the data frame sequence is a key frame, multiplexing and packaging all data frames in the data frame sequence together to generate a corresponding data packet, and if the data frame sequence does not contain a key frame, recoding all the data frames in the data frame sequence, and multiplexing and packaging the recoded data frames together to generate a corresponding data packet.

In an implementation, the processor is further configured to:

when the edge server receives an on-demand request from the user equipment, determine whether a data packet corresponding to a start playing moment specified in the on-demand request is currently stored in a cache, if the data packet corresponding to the start playing moment is currently stored in the cache, obtain the data packet corresponding to the on-demand request from the cache. Otherwise, obtain the data packet corresponding to the on-demand request from a content server.

In an implementation, the processor is further configured to: determine a weight of each data frame of the on-demand video in the entire video in advance according to a principle that the more important the data frame is, the greater the weight is, by using a machine learning method, and after receiving a stunt playing on-demand request for the on-demand video from the user equipment, determine a weight threshold corresponding to a compression strength specified in the stunt playing on-demand request according to a preset mapping relationship between compression strengths and weight thresholds, for a data packet to be transmitted to the user equipment, which is currently stored in a cache, discard a data frame contained in the data packet, whose weight is less than the determined weight threshold, perform encoding and multiplexing operations on a data frame contained in the data packet, whose weight is greater than or equal to the determined weight threshold, and transmit a generated data packet to the user equipment.

In an implementation, the processor is further configured to:

after receiving a specified multiple speed playing request from the user equipment, for a data packet to be transmitted to the user equipment, which is currently stored in a cache, clip data frames contained in the data packet according to a manner of reserving one data frame every N data frames, perform encoding and multiplexing operations on the data frames reserved after the clipping, and transmit a generated data packet to the user equipment, wherein N is a playing multiple specified in the specified multiple speed playing request.

Embodiments of the disclosure also provide a non-transitory computer-readable medium for storing instructions that, when executed, cause a processor to perform the transmission control method of multimedia streaming data described above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A transmission control method of multimedia streaming data, the method comprising:

when an edge server is to transmit a data packet of a video requested by a user equipment to the user equipment, filtering, by the edge server, the data packet;

transmitting, by the edge server, the filtered data packet to the user equipment; and playing, by the user equipment, the video according to the data packet, wherein the video includes an on-demand video and a real-time video, wherein, when the video is the real-time video, the filtering comprises:
  detecting, by the edge server, whether the data packet contains a data frame corresponding to a first moment,
  if the data packet contains the data frame corresponding to the first moment, using the data frame corresponding to the first moment as a start frame,
  performing encoding and multiplexing operations on the start frame and all data frames following the start frame in the data packet according to a preset data packet generation method, and
  transmitting a generated data packet to the user equipment, and
wherein the first moment is a moment that the user equipment requests the video from a content server.

2. The method of claim 1,
wherein, when the video is the real-time video, the filtering comprises:
  detecting, by the edge server, whether the data packet contains a data frame corresponding to a first moment,
  based on detecting that the data packet contains the data frame corresponding to the first moment, using the data frame corresponding to the first moment as a start frame,
  performing encoding and multiplexing operations on the start frame and all data frames following the start frame in the data packet according to a preset data packet generation method,
  transmitting a generated data packet to the user equipment, and
  repeating this step when receiving a next data packet of the real-time video, and
wherein the first moment is a moment that the edge server receives the first data packet of the video from a content server.

3. The method of claim 1,
wherein, when the video is the on-demand video, the filtering comprises:
  using a data frame corresponding to a second moment in the data packet as a start frame,
  performing encoding and multiplexing operations on the start frame and all data frames following the start frame in the data packet according to a preset data packet generation method, and
  transmitting a generated data packet to the user equipment, and
wherein the second moment is a start playing moment specified in the request transmitted by the user equipment.

4. The method of claim 3, wherein the data packet generation method comprises:
  based on identifying that a data frame sequence contains key frames, and the start frame is not a key frame, recoding all data frames prior to a first key frame in the data frame sequence;
  multiplexing and packaging the recoded data frames and unrecoded data frames in the data frame sequence together to generate a corresponding data packet, wherein the data frame sequence includes all data frames used to generate the data packet;
  based on identifying that the start frame of the data frame sequence is a key frame, multiplexing and packaging all data frames in the data frame sequence together to generate a corresponding data packet;
  based on identifying that the data frame sequence does not contain a key frame, recoding all the data frames in the data frame sequence; and
  multiplexing and packaging the recoded data frames together to generate a corresponding data packet.

5. The method of claim 1, further comprising:
  when receiving an on-demand request from the user equipment, determining, by the edge server, whether a data packet corresponding to a start playing moment specified in the on-demand request is currently stored in a cache;
  based on determining that the data packet corresponding to the start playing moment is currently stored in the cache, obtaining the data packet corresponding to the on-demand request from the cache; and
  based on identifying that the data packet corresponding to the start playing moment is not currently stored in the cache, obtaining the data packet corresponding to the on-demand request from a content server.

6. The method of claim 1, further comprising:
  determining, by the edge server, a weight of each data frame of the on-demand video in an entire video in advance according to a principle that the more important the data frame is, the greater the weight is, by using a machine learning method;
  after receiving a stunt playing on-demand request for the on-demand video from the user equipment, determining, by the edge server, a weight threshold corresponding to a compression strength specified in the stunt playing on-demand request according to a preset mapping relationship between compression strengths and weight thresholds; for a data packet to be transmitted to the user equipment, which is currently stored in a cache;
  discarding, by the edge server, a data frame contained in the data packet, whose weight is less than the determined weight threshold;
  performing encoding and multiplexing operations on a data frame contained in the data packet, whose weight is greater than or equal to the determined weight threshold; and
  transmitting a generated data packet to the user equipment.

7. The method of claim 1, further comprising:
  after receiving a specified multiple speed playing request from the user equipment, for a data packet to be transmitted to the user equipment, which is currently stored in a cache, clipping, by the edge server, data frames contained in the data packet according to a manner of reserving one data frame every N data frames;
  performing encoding and multiplexing operations on the data frames reserved after the clipping; and
  transmitting a generated data packet to the user equipment,
wherein N is a playing multiple specified in the specified multiple speed playing request.

8. A transmission control apparatus of multimedia streaming data, configured in an edge server, and comprising:
  a processor,
  wherein the processor is configured to:
    when an edge server is to transmit a data packet of a video requested by a user equipment to the user equipment, and it is a first time that the edge server transmits the data packet according to the request, filter the data packet; and transmit the filtered data packet to the user equipment, and wherein the video includes an on-demand video and a real-time video, wherein, when the video is the real-time video, the processor is further configured to:
- detect whether the data packet of the real-time video currently received by the edge server contains a data frame corresponding to a first moment,
- if the data packet contains the data frame corresponding to the first moment, determine the data frame corresponding to the first moment as a start frame,
- perform encoding and multiplexing operations on the start frame and all data frames following the start frame in the data packet according to a preset data packet generation method, and
- transmit a generated data packet to the user equipment, and wherein the first moment is a moment that the user equipment requests the video from a content server.

9. The transmission control apparatus of claim 8, wherein, when the video is the real-time video, the processor is further configured to:
- detect whether the data packet contains a data frame corresponding to a first moment,
- based on detecting that the data packet contains the data frame corresponding to the first moment, determine the data frame corresponding to the first moment as a start frame,
- perform encoding and multiplexing operations on the start frame and all data frames following the start frame in the data packet according to a preset data packet generation method,
- transmit a generated data packet to the user equipment; otherwise, discarding the data packet received currently, and
- repeat this step when receiving a next data packet of the real-time video, and wherein the first moment is a moment that the edge server receives the first data packet of the video from a content server.

10. The transmission control apparatus of claim 8, wherein, when the video is the on-demand video, the processor is further configured to:
- determine a data frame corresponding to a second moment in the data packet as a start frame,
- perform encoding and multiplexing operations on the start frame and all data frames following the start frame in the data packet according to a preset data packet generation method, and
- transmit a generated data packet to the user equipment, and wherein the second moment is a start playing moment specified in the request transmitted by the user equipment.

11. The transmission control apparatus of claim 10, wherein the processor is further configured to:

based on identifying thata data frame sequence contains key frames, and the start frame is not a key frame, recode all data frames prior to a first key frame in the data frame sequence,
multiplex and package the recoded data frames and unrecoded data frames in the data frame sequence together to generate a corresponding data packet,
based on identifying that the start frame of the data frame sequence is a key frame, multiplex and package all data frames in the data frame sequence together to generate a corresponding data packet,
based on identifying that the data frame sequence does not contain a key frame, recode all the data frames in the data frame sequence, and
multiplex and package the recoded data frames together to generate a corresponding data packet,
wherein the data frame sequence includes all data frames used to generate the data packet.

12. The transmission control apparatus of claim 8, wherein the processor is further configured to:
- when the edge server receives an on-demand request from the user equipment, determine whether a data packet corresponding to a start playing moment specified in the on-demand request is currently stored in a cache,
- based on determining that the data packet corresponding to the start playing moment is currently stored in the cache, obtain the data packet corresponding to the on-demand request from the cache, and
- based on determining that the data packet corresponding to the start playing moment is not currently stored in the cache, obtain the data packet corresponding to the on-demand request from a content server.

13. The transmission control apparatus of claim 8, wherein the processor is further configured to:
- determine a weight of each data frame of the on-demand video in an entire video in advance according to a principle that the more important the data frame is, the greater the weight is, by using a machine learning method; and after receiving a stunt playing on-demand request for the on-demand video from the user equipment,
- determine a weight threshold corresponding to a compression strength specified in the stunt playing on-demand request according to a preset mapping relationship between compression strengths and weight thresholds,
- for a data packet to be transmitted to the user equipment, which is currently stored in a cache, discard a data frame contained in the data packet, whose weight is less than the determined weight threshold,
- perform encoding and multiplexing operations on a data frame contained in the data packet, whose weight is greater than or equal to the determined weight threshold, and
- transmit a generated data packet to the user equipment.

* * * * *